(12) United States Patent
Uchizaki et al.

(10) Patent No.: US 6,728,193 B1
(45) Date of Patent: Apr. 27, 2004

(54) OPTICAL PICKUP DEVICE AND OPTICAL DISC DRIVING DEVICE

(75) Inventors: Ichiro Uchizaki, Fujisawa (JP); Kazuya Tsunoda, Zama (JP)

(73) Assignee: Kabushiki Kaisha Toshiba (JP)

( * ) Notice: Subject to any disclaimer, the term of this patent is extended or adjusted under 35 U.S.C. 154(b) by 0 days.

(21) Appl. No.: 09/553,932

(22) Filed: Apr. 21, 2000

(30) Foreign Application Priority Data

Apr. 22, 1999 (JP) ............................................. 11-115291

(51) Int. Cl.⁷ .................................................. G11B 7/00
(52) U.S. Cl. ............................. 369/112.01; 369/112.05; 369/112.23; 369/44.23
(58) Field of Search ......................... 369/44.23, 44.26, 369/44.37, 53.23, 53.28, 112.01, 112.21, 112.23, 112.24, 112.05, 112.15, 112.25, 112.1

(56) References Cited

U.S. PATENT DOCUMENTS

| | | | |
|---|---|---|---|
| 5,289,451 A | * 2/1994 | Ashinuma et al. | 369/47.55 |
| 5,815,293 A | * 9/1998 | Komma et al. | 369/112.08 |
| 5,974,020 A | 10/1999 | Ju et al. | 369/112 |
| 5,986,998 A | * 11/1999 | Park | 369/121 |
| 6,084,843 A | * 7/2000 | Abe et al. | 369/112.07 |
| 6,195,315 B1 | 2/2001 | Takahashi et al. | 369/44.23 |
| 6,363,046 B1 | * 3/2002 | Yoo et al. | 369/112.23 |

FOREIGN PATENT DOCUMENTS

| | | | |
|---|---|---|---|
| JP | 10208267 A | 8/1998 | G11B/7/12 |
| JP | 200011417 | 1/2000 | G11B/7/25 |

* cited by examiner

Primary Examiner—Thang V. Tran
Assistant Examiner—Bach Vuong
(74) Attorney, Agent, or Firm—Gray Cary Ware & Freidenrich LLP

(57) ABSTRACT

An optical pickup device includes a double-source built-in semiconductor laser for emitting light of a first wavelength and light of a second wavelength, a first divergence modifying device for modifying the diverging rate of emitted light from the double-source built-in semiconductor laser to a first diverging rate, a second divergence modifying device for modifying the diverging rate of a part of transmitted light through the first divergence modifying device to a second diverging rate, and an objective lens which focalizes the light with the first wavelength modified to the first diverging rate by the first divergence modifying device onto a first optical disc, and focalizes the light with the second wavelength modified to the second diverging rate by the first and second divergence modifying devices onto a second optical disc.

10 Claims, 8 Drawing Sheets

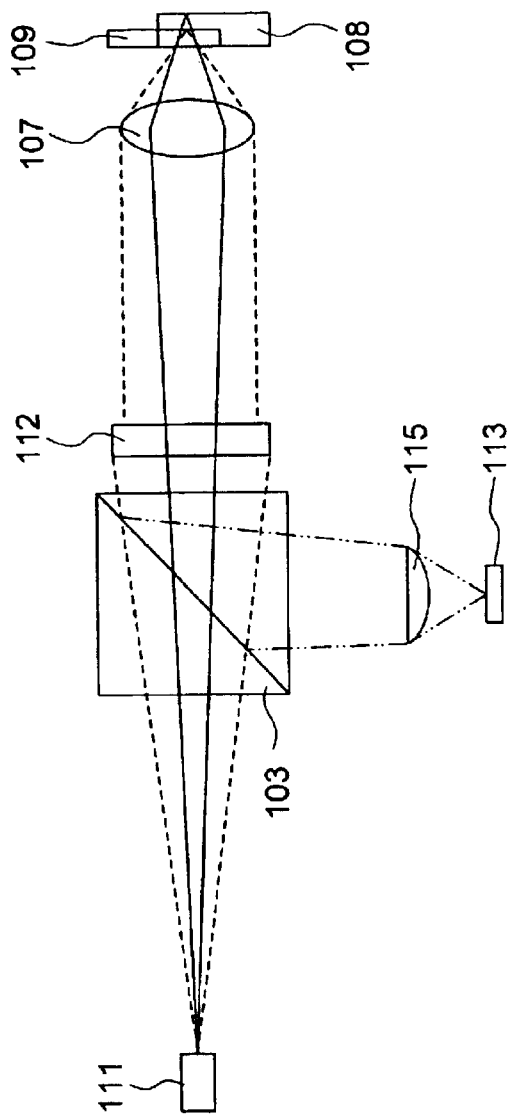
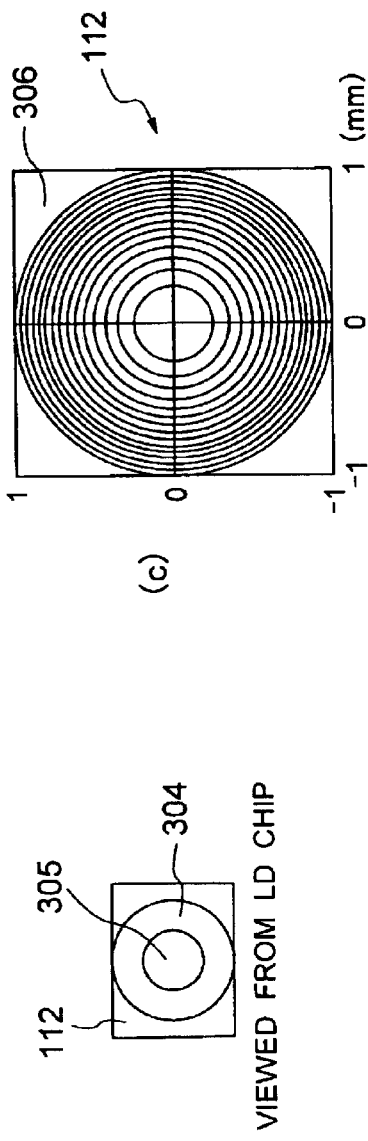
FIG. 10A
FIG. 10B
VIEWED FROM LD CHIP
FIG. 10C

OPTICAL PICKUP DEVICE AND OPTICAL DISC DRIVING DEVICE

BACKGROUND OF THE INVENTION

1. Field of the Invention

This invention relates to an optical pickup device and an optical disc drive, and more particularly to those using a laser array in which two light sources with center wavelengths of 650 nm and 780 nm are formed on a common semiconductor substrate for the purpose of simplifying data recording/reading system for both DVD (digital versatile disc) and CD (compact disc) or CD-R (compact disc-recordable).

2. Related Background Art

Today, DVD systems have been brought into practice and are being spread as optical disc systems that can record massive data more than seven times than that of CD or CD-R (hereinafter called "CDs"). On the other hand, CD systems have been widely spread as optical disc systems. Therefore, in order to promote diffusion of DVD systems, it is desirable to provide DVD systems with compatibility with CD systems so that they can reproduce data not only from DVDs but also from CDs.

For reading of data from CDs, semiconductor lasers (laser diodes: LDs) for the wavelength around 780 nm are used. DVD systems, however, use LDs for the center wavelength 650 nm to realize the recording density about seven times of CDs. On the other hand, since the recording medium of CDs (particularly CD-R) is a pigment system material, sufficient sensitivity is not expected with LDs with the center wavelength 650 nm, and for providing DVD system with compatibility with CD systems, they are required to have a two-light-source optical pickup device for two center wavelengths 650 nm and 780 nm.

FIG. 1 is an explanatory diagram schematically showing configuration of a conventional optical pickup device having two independent light sources.

The conventional pickup device with two independent light sources shown in FIG. 1 includes a first optical integrated unit 101 for detection by emitting light with the center wavelength 650 nm, a second optical integrated unit 102 for detection by emitting light with the center wavelength of 780 nm, a dichroic filter 103 that transmits light whose center wavelength is 650 nm and reflects light whose center wavelength is 780 nm, a collimator lens 104 that collimates transmitted beams which are beams from the first optical integrated unit 101 and the second optical integrated unit 102 into parallel beams, a folding mirror 105 that change the direction of beams from the parallel direction to the vertical direction relative to an optical disc, a wavelength-selective iris 106 for adjusting the numerical aperture (NA) in accordance with the wavelength of light, and an objective lens 107 focalizing beams with center wavelengths of 650 nm and 780 nm which have been aligned in parallel by the collimator lens 104 onto optical discs. The first optical integrated unit 101 as the light source of light whose center wavelength is 650 nm and the second optical integrated unit 102 as the light source of light whose center wavelength is 780 nm are provided independently from each other.

Beams having the center wavelength 650 nm from the first optical integrated unit 101 pass through the dichroic filter 103 while spreading the beam diameter, and they are collimated into parallel beams when they pass through the collimator lens 104.

Thereafter, they are reflected by the folding mirror 105 to the vertical direction relative to the DVD 109, introduced into the objective lens 107 under adjustment of the numerical aperture by the wavelength-selective iris 106, focused onto the DVD 109 by the objective lens 107, and reflected by the DVD 109. Reflected beams from the DVD 109 contain data about the presence or absence of any record pits on the DVD 109, then return along the path of the emitted light in the opposite direction, and are detected by the first optical integrated unit 101.

On the other hand, the beams from the second optical integrated unit 102 having the center wavelength 780 nm are reflected by the dichroic filter 103 while spreading outward to impinge on the collimator lens 104, and are aligned into parallel beams when they pass through the collimator lens 104. Then, they are reflected into the vertical direction relative to the CD 108 by the folding mirror 105, then introduced into the objective lens 107 after being adjusted in numerical aperture by the wavelength-selective iris 106, focused onto the CD 108 by the objective lens 107 and reflected from the CD 108. Reflected beams from the CD 108 contain data about the presence or absence of any record pits on the CD 108, return along the path of the emitted light in the opposite direction, and are detected by the second optical integrated unit 102.

Since the CD 108 and the DVD 109 are different in spot size by the objective lens 107, the effective numerical aperture is usually adjusted by the wavelength-selective iris 106, for example, in accordance with the wavelength of light.

However, the conventional optical pickup device having two independent light sources requires complicated positional adjustment of two light sources to align their optical axes, and the use of two independent light sources makes it difficult to decrease the size of the device.

For the purpose of overcoming these two problems in the optical pickup device having two light sources, a double-source built-in semiconductor laser array having two light sources for center wavelengths of 650 nm and 780 nm on a common semiconductor substrate was developed to simplify the optical system (Japanese Patent Application No. hei 10-181068).

FIG. 2 is a cross-sectional view showing configuration of the double-source built-in semiconductor laser array.

The semiconductor laser array shown in FIG. 2 includes double heterostructures having different parameters, which are formed on different locations of a common semiconductor substrate, by substantially commonly designing upper parts of cladding layers of the double heterostructures in respective regions to integrate resonant elements which generate the light with the center wavelength 650 nm and the light with the center wavelength of 780 nm, respectively. Thus, this semiconductor laser array includes a laser element portion 240 for the oscillation wavelength of 780 nm and a laser element portion 241 for the oscillation wavelength of 650 nm.

In the laser element portions 240 and 241, sequentially stacked on a common gallium-arsenic GaAs substrate 21 are: n-type (n-) GaAs buffer layer 211, 221; n-$In_{0.5}(Ga_{0.3}Al_{0.7})_{0.5}P$ first cladding layers 212, 222; $In_{0.5}(Ga_{0.5}Al_{0.5})_{0.5}P$ optical guide layer 213, 223; multi-quantum well (MQW) active layers 214, 224; $In_{0.5}(Ga_{0.5}Al_{0.5})_{0.5}P$ optical guide layers 215, 225; p-$In_{0.5}(Ga_{0.3}Al_{0.7})_{0.5}P$ second cladding layers 216, 226; p-$In_{0.5}Ga_{0.5}P$ etching stop layers 217, 227; p-$In_{0.5}(Ga_{0.3}Al_{0.7})_{0.5}P$ third cladding layers 218, 228; p-$In_{0.5}Ga_{0.5}P$ cap layers 219, 229; n-GaAs current blocking layer 231; and p-GaAs buried layer 232.

In the laser element portion 240 for the oscillation wavelength 780 nm, the active layer 214 has a MQW structure including $Ga_{0.9}Al_{0.1}As$ well layers and $Ga_{0.65}Al_{0.35}As$ barrier layers. In the laser element portion 241 for the oscillation wavelength 650 nm, the active layer 224 has a MQW structure including $In_{0.5}Ga_{0.5}As$ well layers and $In_{0.5}(Ga_{0.5}Al_{0.5})_{0.5}P$ barrier layers.

In the structure of the semiconductor laser array configuration shown in FIG. 2, by combination of the third cladding layers 218, 228 having a convex stripe configuration and the GaAs current blocking layer 231, steps of refractive indices are formed in the horizontal direction, and both laser element portions 240, 241 form refractive index-guided lasers. The GaAs current blocking layer 231 also functions to confine the current within the ridge stripe portion in each laser element portion. These element portions 240, 241 are electrically isolated by a separation groove 236, and they are independently driven via electrodes 233, 234. A minus-side electrode 235 can be formed on the bottom surface of the substrate 210 to be commonly used by both element portions. The laser element portion 240 for the oscillation wavelength 780 nm is used with CDs whereas the laser element portion 241 for the oscillation wavelength 650 nm is used with DVDs.

FIG. 3A is an explanatory diagram schematically showing configuration of a conventional double-source optical pickup device using a double-source integrated unit having a double-source built-in laser array, and FIG. 3B is an explanatory diagram schematically showing configuration of the double-source optical integrated unit.

The conventional double-source optical pickup device shown in FIG. 3A includes a double-source optical integrated unit 110 for emitting light with the center wavelength 650 nm and that of 780 nm, a collimator lens 104 that collimates transmitted beams which are beams from the double-source optical integrated unit 110 into parallel beams, a folding mirror 105 that change the direction of beams from the parallel direction to the vertical direction relative to an optical disc, a wavelength-selective iris 106 for adjusting the numerical aperture in accordance with the wavelength of light, and an objective lens 107 focalizing beams with center wavelengths of 650 nm and 780 nm which have been aligned in parallel by the collimator lens 104 onto optical discs.

Beams having the center wavelength 650 nm or 780 nm from the double-source optical integrated unit 110 are collimated into parallel beams when they pass through the collimator lens 104. Thereafter, they are reflected by the folding mirror 105 to the vertical direction relative to the DVD 109 or the CD 108, introduced into the objective lens 107 under adjustment of the numerical aperture by the wavelength-selective iris 106, focused onto the DVD 109 or the CD 108 by the objective lens 107, and reflected by the DVD 109 or the CD 108. Reflected beams from the DVD 109 or the CD 108 contain data about the presence or absence of any record pits on the DVD 109 or the CD 108, then return along the path of the emitted light in the opposite direction, and are detected by the double-source optical integrated unit 110. The light with the center wavelength 780 nm is used for the CD 108 whereas the light with the center wavelength 650 nm is used for the DVD 109.

The double-source optical integrated unit 110 shown in FIG. 3B includes a double-source built-in semiconductor laser array 111 in which two light sources are built on a common semiconductor substrate, an optical device 112 that directly transmits emitted light from the semiconductor laser array 111 but diffracts reflected light from an optical disc, and a photodiode (PD) for detection of signals and errors.

The semiconductor laser array 111 emits two kinds of light having the center wavelengths of 650 nm and 780 nm. Although the emitted light from the semiconductor laser array 111 directly pass through the optical device 112, reflected light from DVD or CD is diffracted to the position of the detection PD 113, and detected by the detection PD 113. The optical device 112 may be a hologram element, for example. A hologram element used as the optical device 112 may be provided integrally with the optical integrated unit 110 as shown in FIG. 3B, or may be provided separately from the optical integrated unit 110. It may be located between the collimator lens 104 and the folding mirror 105, between the folding mirror 105 and the iris 106, or between the iris 106 and the objective lens 107, for example.

When the hologram element is provided integrally with the optical integrated unit 110 as shown in FIG. 3B, it directly transmits emitted light from the semiconductor laser array 111, but diffracts diffracted light of a predetermined order in the reflected light from DVD or CD onto the position of the detecting PD 113, and converges it with the aid of the collimator lens 104. Usable as the hologram element is a micro diffraction grating having a transfer function so designed that light entering into a predetermined position on its surface be diffracted to a predetermined position on the detecting PD 113, and its pitch may be inconstant.

The detecting PD 113 has a plurality of divisional photo-detecting regions, and can detect focusing errors and tracking errors. In the illustrated example, both of 780 nm laser light and 650 nm laser light are detected by the common detecting PD 113.

In the illustrated optical system, since two laser emission points of the semiconductor laser array 111 are very close with the distance from 5 $\mu$m to 500 $\mu$m, two optical axes approximately overlap, and they can be regarded as a single common optical axis. That is, although there are two optical axes in the optical system shown in FIG. 1, the optical system shown in FIG. 3 aligns them into one common optical axis, configuration of the optical system is much more simplified.

As reviewed above, development and employment of a double-source optical integrated unit having a double-source built-in semiconductor laser array has made it possible to construct CD-compatible DVD optical pickup device and optical disc drive which are small in size and easy to adjust the optical system.

However, DVD and CD are different in thickness of the disc substrate, there was the problem that conventional devices could not sufficiently compensate the disc tilt property, defocusing property, jittering property and tracking property deteriorated by wavefront aberration (including spherical aberration) caused by the difference in thickness of the disc substrate. Normally, aberration optimization is effected for DVD with a strict specification. Therefore, wavefront aberration of CD during reading sometimes amounts to $0.5\lambda$ ($\lambda$ is the wavelength), and may largely surpass $0.07 \lambda$ rms which is considered the normally acceptable limit.

FIGS. 4A and 4B are explanatory diagrams schematically showing configurations of converged light onto DVD (FIG. 4A) and CD (FIG. 4B).

As shown in FIG. 4A, in DVD optimized in aberration, the focal point of the laser light is focused onto a disc signal surface 114. However, as shown in FIG. 4B, in CD with a thicker disc substrate than that of DVD, a large aberration is produced, and the focal point of the laser light is not focused to a point on the disc signal surface 114.

FIG. 5 is a graph which shows a relation between thickness of the disc substrate and wavefront aberration of an objective lens having the numerical aperture of 0.6 so designed to have no aberration when the wavelength of light is 635 nm and thickness of the disc substrate is 0.6 mm.

In case of the graph shown in FIG. 5, in DVD whose disc substrate is 0.6 mm thick, wave aberration is zero. However, in CD whose disc substrate is 1.2 mm thick, wave aberration is as large as 0.6λ. (λ is the wavelength).

Such a large wavefront aberration causes focusing errors and tracking errors, and deteriorates qualities of CD-compatible DVD optical pickup devices and optical disc driving devices.

Heretofore, there were the following two techniques for correcting the wave aberration.

FIG. 6 is an explanatory diagram schematically showing configuration of a double-source built-in optical pickup device having a first wavefront aberration correcting device for the CD wavelength.

The double-source optical pickup device shown in FIG. 6 includes a double-source built-in semiconductor laser 117 for emitting light with the center wavelength 650 nm and that of 780 nm, a half mirror 103 which transmit about a half of the incident light and reflecting the other half, a collimator lens 104 that collimates transmitted beams which are emitted light from the double-source built-in semiconductor laser 117 into parallel beams, a special objective lens 118 which focuses light with the center wavelength 780 nm aligned into parallel beams by the collimator lens 104 onto the CD 108 and focusing light with the center wavelength of 650 nm onto the DVD 109, and a signal/error detecting PD 113 for detecting light with the center wavelength 650 nm and light with the center wavelength 780 nm which-are reflected light from the CD 108 and the DVD 109. The special objective lens 118 has a special shape for converging light entering into a central portion onto the CD 108 and light entering into the peripheral portion onto the DVD 109. The beams entering into the special objective lens 118, both with the center wavelength 650 nm or with the center wavelength 780 nm, are parallel beams. Although not shown for simplicity, a folding mirror for reflecting beams from the parallel direction to the vertical direction relative to the optical disc is interposed between the collimator lens 104 and the special objective lens 118. That is, the direction of the transmitted light from the collimator lens 104 and the direction of the transmitted light from the special objective lens 118 are normal to each other.

Light with the center wavelength 650 nm emitted from the LD 117 are aligned into parallel beams as a result of reflection by the half mirror 103 and transmission through the collimator lens 104. Then, it is reflected to the vertical direction relative to the DVD 109 by the folding mirror, and enters into the special objective lens 118. Part of the light with the center wavelength 650 nm entering into the special objective lens 118, which enters into the peripheral portion of the special objective lens 118, is focused onto the DVD 109, and reflected thereby. Although the light focused onto the DVD 109 is about a half of the light with the center wavelength 650 nm entering into the special objective lens 118, it is sufficient for getting recorded data from the DVD 109. Reflected light reflected by the DVD 109 contains data about the presence or absence of recording pits on the DVD 109. It returns along the path of the emitted light in the opposite direction, and after passing through the half mirror 113, it is detected by the detecting PD.

On the other hand, light with the center wavelength 780 nm emitted from the LD 117 is aligned into parallel beams as a result of reflection by the half mirror 103 and transmission through the collimator lens 104. Then, it is reflected to the vertical direction relative to the CD 108 by the folding mirror, and enters into the special objective lens 118. Part of the light with the center wavelength 780 nm entering into the special objective lens 118, which enters into the central portion of the special objective lens 118, is focused onto the CD 108, and reflected thereby. Although the light focused onto the CD 108 is about a half of the light with the center wavelength 780 nm entering into the special objective lens 118, it is sufficient for getting recorded data from the CD 108. Reflected light reflected by the CD 108 contains data about the presence or absence of recording pits on the CD 108. It returns along the path of the emitted light in the opposite direction, and after passing through the half mirror 113, it is detected by the detecting PD.

As explained above, the first wavefront aberration correcting device minimizes wavefront aberration for both the DVD 109 and the CD 108 by using the special objective lens 118 whose central portion and peripheral portion are different in focal distance.

FIGS. 7A through 7C are explanatory diagrams schematically showing configuration of a second wavefront aberration correcting device for the CD wavelength.

The second wavefront aberration correcting device uses ordinary elements as respective components of the optical pickup device, such as the wavelength-selective iris 106 and the objective lens 107, but it is configured to spread out the incident light to the objective lens 107 only when it is the light with the center wavelength 780 nm. That is, since aberration of DVD is already optimized, as shown in FIG. 7A, by introducing the light with the center wavelength 650 nm is introduced as parallel into the objective lens 107, it can be focused onto the DVD 109.

On the other hand, if the light with the center wavelength 780 nm is introduced as parallel beams into the objective lens 107, larger wavefront aberration is produced due to the thickness of the disc substrate of the CD 108, and the focal point of the laser light is not focused to a point on the disc signal surface 114 as shown in FIG. 7B. Therefore, in case of the light with the center wavelength 780 nm, by introducing it as spread light into the objective lens 107, wavefront aberration can be minimized, and the focal point of the laser light can be focused onto the CD 108 as shown in FIG. 7C.

However, in case of the first wavefront aberration correcting device, it is necessary to shape the objective lens into a complicated, special form, and there are a lot of difficulties for actual mass production and practical use, when selection of materials, preparation of an accurate mass-production mold, manufacturing cost for mass-production, and so on, are taken into account.

Additionally, regarding the second wavefront aberration correcting device, it is easy to bring it into practical use when using two independent light sources. However, when a double-source built-in semiconductor laser array including two light sources formed on a common semiconductor substrate is used, since positions of two light sources in the optical axis direction overlap with each other, light only from one of the light sources cannot be introduced as spread light into the objective lens by using ordinary elements as respective components of the optical pickup device.

SUMMARY OF THE INVENTION

It is therefore an object of the invention to provide an optical pickup device and an optical disc device having two built-in light sources, which include a wavefront aberration correcting device having a relatively simple structure and capable of minimizing wavefront aberration during reproduction of data not only for DVD but also for CD.

According to the invention, there is provided the optical pickup device including a double-source built-in semiconductor laser for emitting light of a first wavelength and light of a second wavelength, a first divergence modifying device for modifying the diverging rate of emitted light from the double-source built-in semiconductor laser to a first diverging rate, a second divergence modifying device for modifying the diverging rate of a part of transmitted light through the first divergence modifying device to a second diverging rate, and an objective lens which focuses the light with the first wavelength modified to the first diverging rate by the first divergence modifying device onto a first optical disc, and focuses the light with the second wavelength modified to the second diverging rate by the first and second divergence modifying devices onto a second optical disc. Thereby, the optical pickup device according to the invention can minimize wavefront aberrations of first and second optical discs which generate different wavefront aberration due to a difference in thickness between their disc substrates, and can focalize focal points of laser light on disc signal surfaces of respective optical discs.

In the typical configuration, the first divergence modifying device may be a converging device for converging emitted light from the double-source built-in semiconductor laser into parallel beams, the second divergence modifying device may be a spreading device for changing the part of the transmitted light through the converging device into spread beams, the objective lens focalizing the light of the first wavelength modified into parallel beams by the converging device onto the first optical disc and focalizing the light of the second wavelength modified into spread beams by the converging device and the spreading device onto the second optical disc.

According to the invention, there is provided the whole configuration of the optical pickup device including a double-source built-in semiconductor laser for emitting light of a first wavelength and light of a second wavelength, a first divergence modifying device for modifying the diverging rate of emitted light from the double-source built-in semiconductor laser to a first diverging rate, a second divergence modifying device for modifying the diverging rate of a part of transmitted light through the first divergence modifying device to a second diverging rate, an objective lens which focuses the light with the first wavelength modified to the first diverging rate by the first divergence modifying device onto a first optical disc, and focuses the light with the second wavelength modified to the second diverging rate by the first and second divergence modifying devices onto a second optical disc, a reflected light separating device which separates reflected beams from the first and second optical discs away from the path of the emitted light from the double-source built-in semiconductor laser, and a detecting device which detects reflected beams from the first and second optical discs separated by the reflected light separating device.

According to the invention, there is provided the typical whole configuration of the optical pickup device including a double-source built-in semiconductor laser for emitting light of a first wavelength and light of a second wavelength, a converging device for converging emitted light from the double-source built-in semiconductor laser into parallel beams, a spreading device for changing the part of the transmitted light through the converging device into spread beams, an objective lens which focuses focusing the light of the first wavelength modified into parallel beams by the converging device onto the first optical disc and focuses the light of the second wavelength modified into spread beams by the converging device and the spreading device onto the second optical disc, a reflected light separating device which separates reflected beams from the first and second optical discs away from the path of the emitted light from the double-source built-in semiconductor laser, and a detecting device which detects reflected beams from the first and second optical discs separated by the reflected light separating device.

With the configuration of the optical pickup device according to the invention, it is possible to provide an optical pickup device having two built-in light sources, which includes a wavefront aberration correcting device having a relatively simple structure and capable of minimizing wavefront aberration during reproduction of data not only for DVD but also for CD.

More concrete configuration of the optical pickup device according to the invention will be explained later.

According to the invention, there is provided the optical disc device including the optical pickup device according to the invention, and an optical disc device for rotatory driving the optical disc.

BRIEF DESCRIPTION OF THE DRAWINGS

FIGS. 10A through 10C are explanatory diagrams which schematically show configuration of an optical pickup device according to the third embodiment of the invention.

DESCRIPTION OF THE PREFERRED EMBODIMENTS

Explained below are embodiments of the optical pick device and the optical disc drive according to the invention with reference to the drawings.

Figure 8:
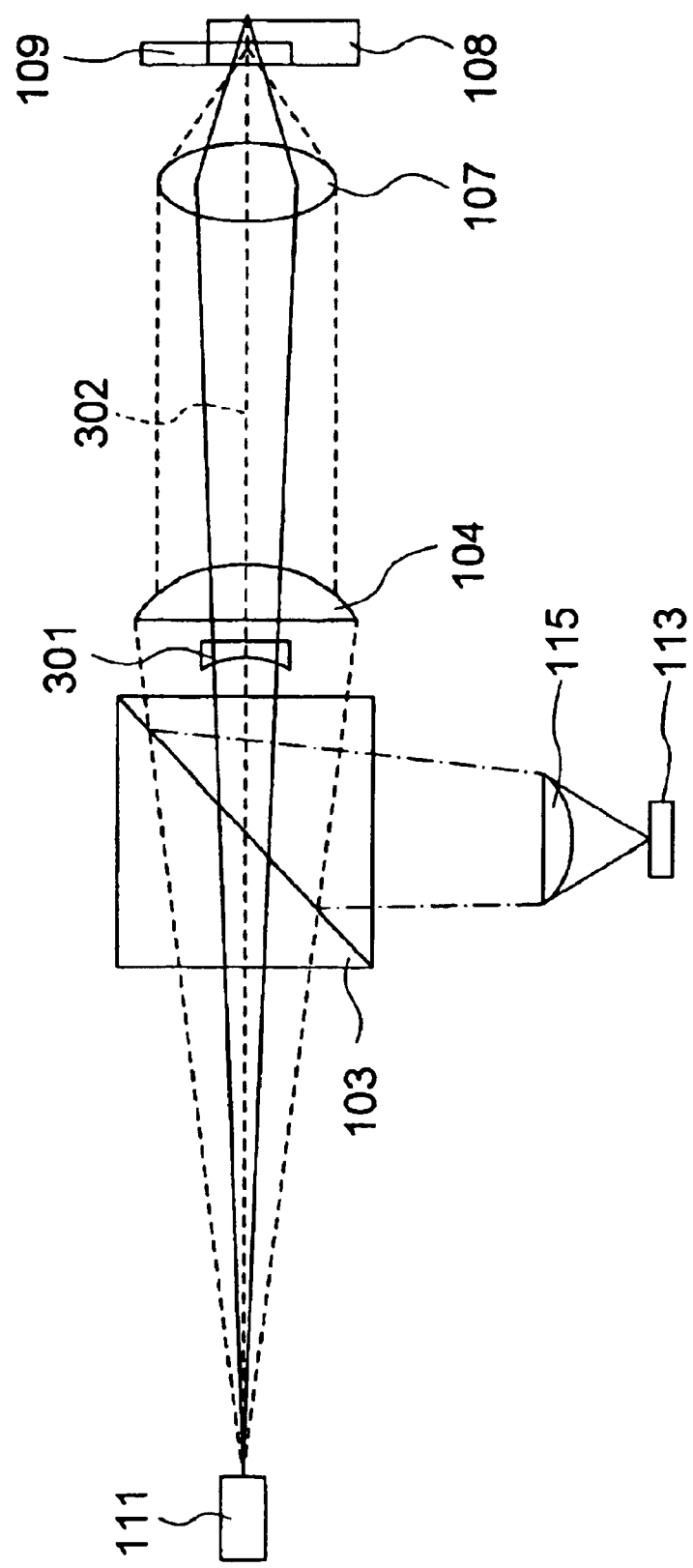
FIG. 8 is an explanatory diagram which schematically shows configuration of an optical pickup device according to the first embodiment of the invention.

FIG. 8 is an explanatory diagram which schematically shows configuration of an optical pickup device according to the first embodiment of the invention.

The optical pickup device according to the first embodiment of the invention shown in FIG. 8 includes a double-source built-in semiconductor laser 111 for emitting light with the center wavelength 650 nm and that of 780 nm; a prism 103 for directly transmitting emitted light from the double-source built-in semiconductor laser 111 and reflecting reflected light from the DVD 109 and the CD 108; a collimator lens 104 that collimates transmitted beams which are emitted light from the double-source built-in semiconductor laser 111; a concave lens 301 for spreading part of the transmitted light from the collimator lens 104, which enters into the central portion near its optical axis, into spread light; an objective lens 107 which focuses light with the center wavelength 650 nm aligned into parallel beams by the collimator lens 104 onto the DVD 109 and focusing light with the center wavelength 780 nm changed into spread light by the collimator lens 104 and the concave lens 301 onto the CD 108; a cylindrical lens 115 for adjusting astigmatism of reflected light from the prism 103, which is the reflected light from the DVD 109 and the CD 108; and a signal/error detecting photodiode 113 for detecting reflected light from the prism 103, which is the reflected light from the DVD 109 and the CD 108. Although not shown for simplicity, a folding mirror for reflecting beams from the parallel direction to the vertical direction relative to the optical disc is interposed between the collimator lens 104 and the objective lens 107. That is, the direction of the transmitted light from the collimator lens 104 and the direction of the transmitted light from the objective lens 107 are normal to each other. As explained above, the double-source built-in semiconductor laser 111 is a semiconductor laser array including two light sources built on a common semiconductor substrate, and the distance between two laser emission points is 500 μm or less. Therefore, two optical axes approximately overlap, and they can be regarded as a single common optical axis 302. Actually, however, under the current technical level of the manufacturing process, the distance between two laser emission points is about 5 μm to 500 μm. The prism 103 may be located between the LD 111 and the concave lens 301 or the collimator lens 104. Alternatively, it may be located between the collimator lens 104 and the objective lens 107. In the latter case, however, the cylindrical lens 115 is required to have the function of a convex lens for converging reflected light.

Figure 7A:
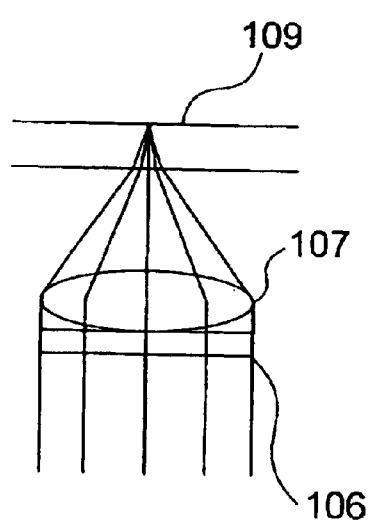
FIGS. 7A through 7C are explanatory diagrams which schematically show configuration of a second wavefront aberration correcting device for the CD wavelength.
Figure 7B:
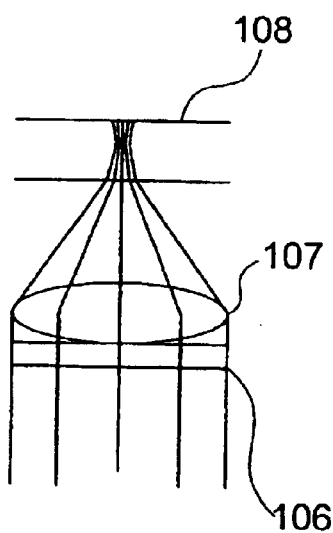

The Light with the center wavelength 650 nm emitted from the LD 111 passes through the prism 103 while spreading outward and the light passing through the concave lens 301, which is the central portion near the optical axis, is further spread out. The part of the emitted light from the LD 111, which passes through and spread out by the concave lens 301, is still spread light even after passing through the collimator lens 104, but the light passing outside the concave lens 301 is converged into parallel beams after passing through the collimator lens 104. Then, it is reflected to the vertical direction relative to the DVD 109 by the folding mirror, and enters into the objective lens 107. Part of the light with the center wavelength 650 nm entering as parallel beams into the peripheral portion of the objective lens 107 is focused onto the DVD 109 and reflected thereby as shown in FIG. 7A. On the other hand, the light entering as the spread light into the central portion near the optical axis of the objective lens 107 does not focus onto the DVD 109 due to the wavefront aberration caused by the concave lens 301, and it is not used substantially. However, for DVD, by using an objective lens having the numerical aperture of 0.6 which sufficiently decreases the wavefront aberration for the thickness of 0.6 mm of DVD disc substrates and sufficiently using the light entering into the peripheral portion of the objective lens 107 as parallel beams, an acceptable amount of light for getting recorded data from the DVD 109 can be obtained. The reflected light reflected by the DVD 109 contains data about the presence or absence of recording pits on the DVD 109, and it returns along the path of the emitted light in the opposite direction, and after being reflected by the prism 103 and adjusted in astigmatism or converged by the cylindrical lens 115, it is detected by the detecting PD 113.

Figure 7C:
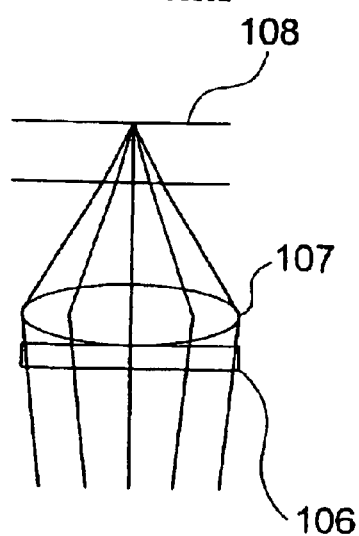

On the other hand, the light with the center wavelength 780 nm emitted from the LD 111 passes through the prism 103 while spreading outward and the light passing through the concave lens 301, which is the central portion near the optical axis, is further spread out. The part of the emitted light from the LD 111, which passes through and spread out by the concave lens 301, is still spread light even after passing through the collimator lens 104, but the light passing outside the concave lens 301 is converged into parallel beams after passing through the collimator lens 104. Then, it is reflected to the vertical direction relative to the CD 108 by the folding mirror, and enters into the objective lens 107. Part of the light with the center wavelength 780 nm entering as spread beams into the central portion of the objective lens 107 is focused onto the CD 108 and reflected thereby as shown in FIG. 7C. That is, by introducing the light with the center wavelength 780 nm as spread light into the objective lens 107, the wavefront aberration caused by the 1.2 mm thickness of the disc substrate of the CD 108 is cancelled. On the other hand, the light entering as the parallel beams into the peripheral portion of the objective lens 107 does not focus onto the CD 108 due to the wavefront aberration caused by the 1.2 mm thickness of the disc substrate of the CD 108, and it is not used substantially. However, since CDs have a wider tolerance against signal deterioration than DVDs, and the maximum numerical aperture of the objective lens 107 used for CD is 0.45, by mainly using the light entering into the central portion of the objective lens 107 as spread light, an acceptable amount of light for getting recorded data from the CD 108 can be obtained. The reflected light reflected by the CD 108 contains data about the presence or absence of recording pits on the CD 108, and it returns along the path of the emitted light in the opposite direction, and after being reflected by the prism 103 and adjusted in astigmatism or converged by the cylindrical lens 115, it is detected by the detecting PD 113.

Figure 1:
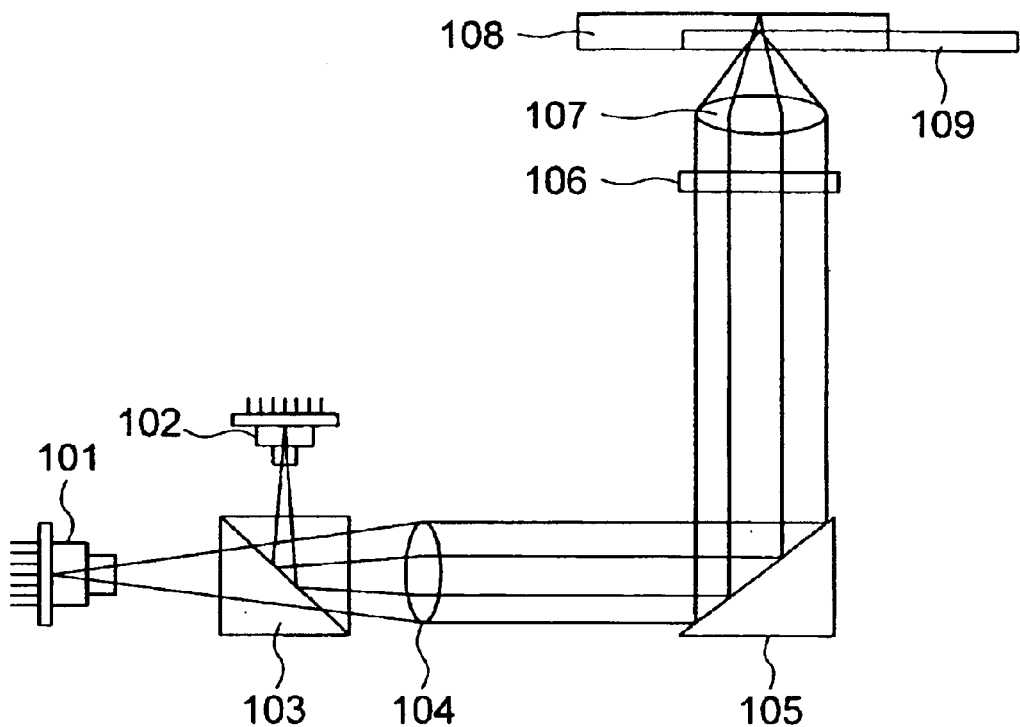
FIG. 1 is an explanatory diagram which schematically shows configuration of a conventional optical pickup device with two independent light sources.
Figure 2:
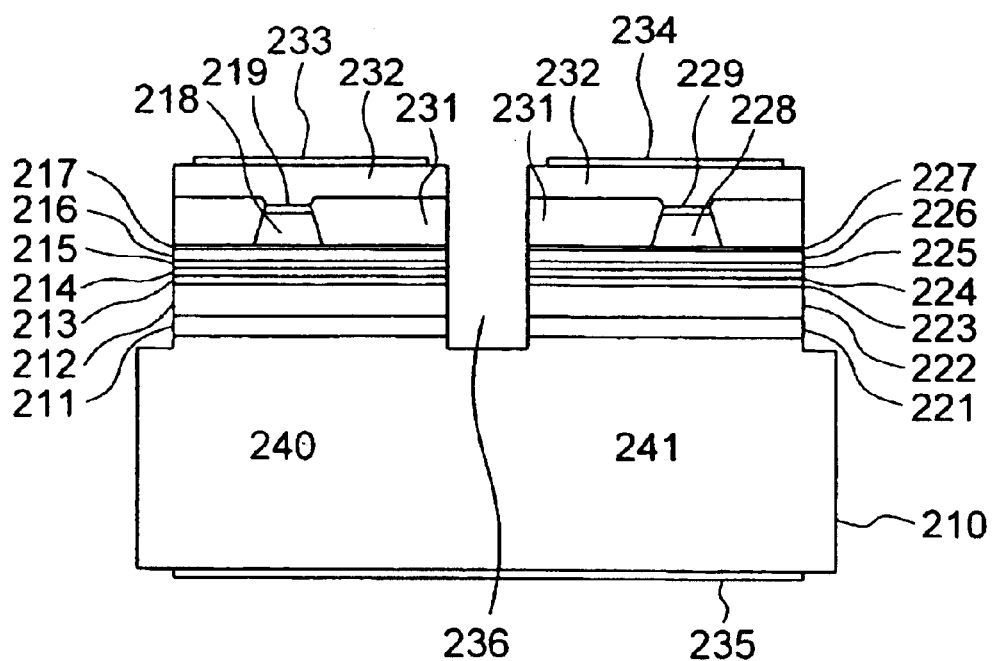
FIG. 2 is a cross-sectional view of a double-source built-in semiconductor laser array.
Figure 3A:
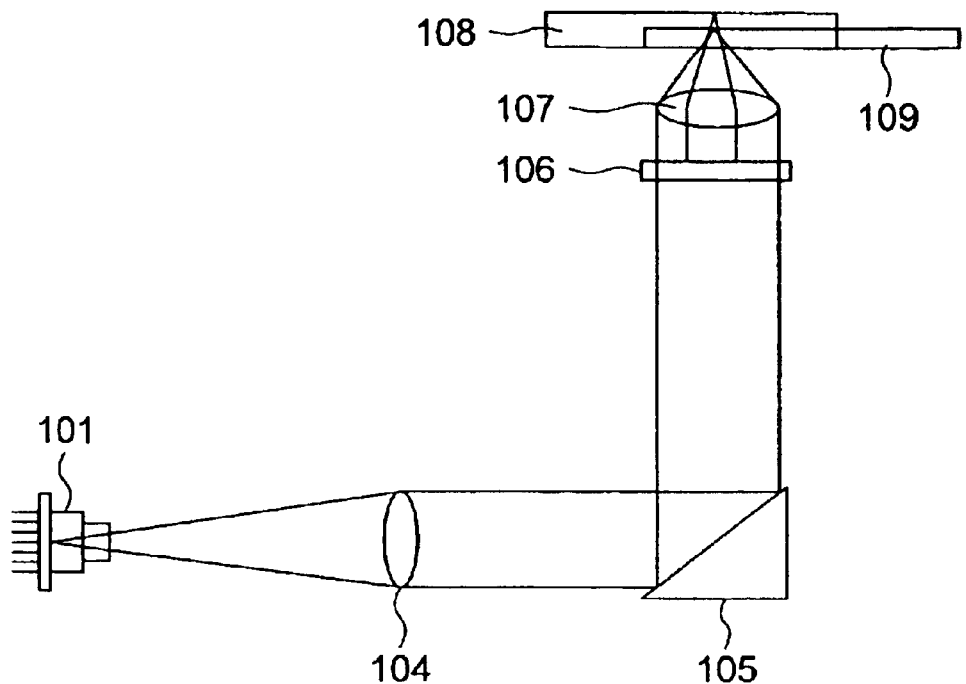
FIG. 3A is an explanatory diagram which schematically shows configuration of a conventional double-source optical pickup device using a double-source optical integrated unit including a double-source built-in semiconductor laser array.
Figure 3B:
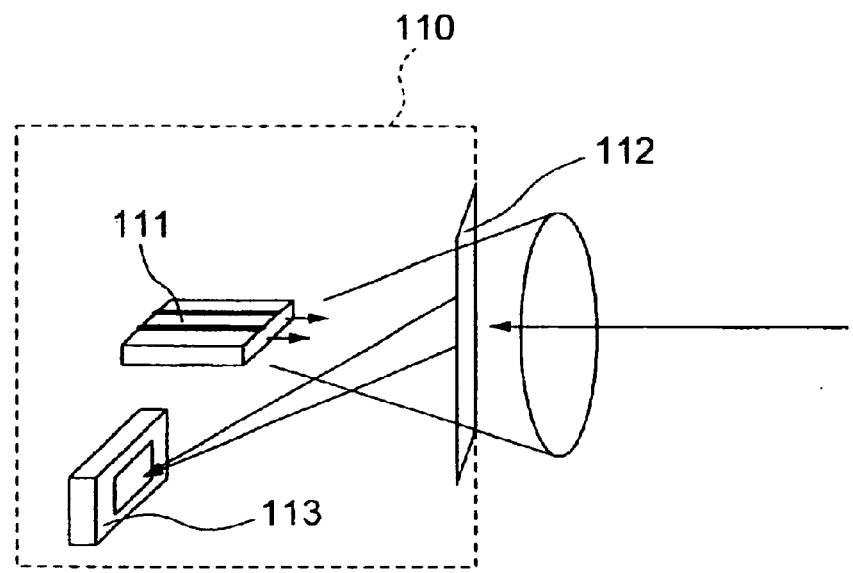
FIG. 3B is an explanatory diagram which schematically shows configuration of the double-source optical integrated unit.
Figure 4A:
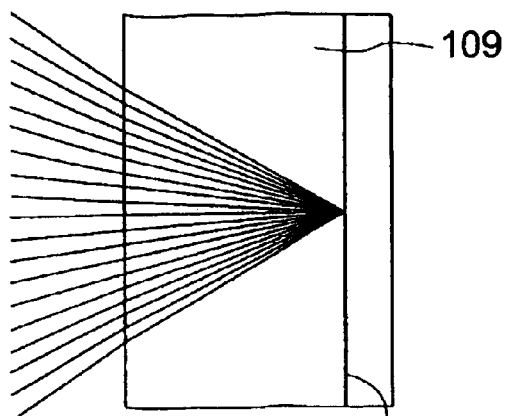
FIG. 4A is an explanatory diagram which schematically shows an aspect of focused light on DVD.
Figure 4B:
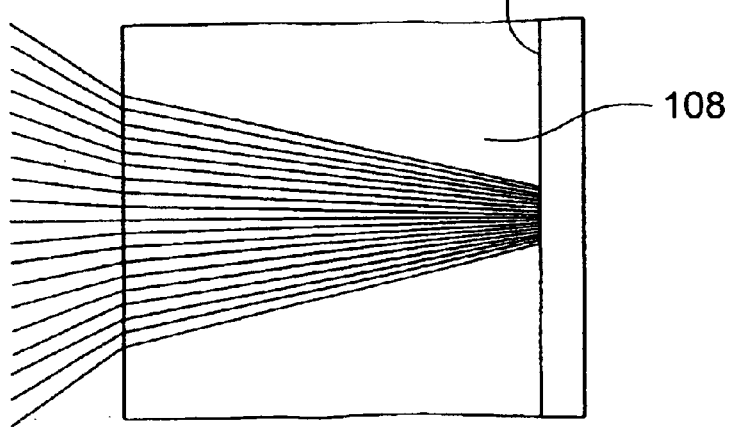
FIG. 4B is an explanatory diagram which schematically shows an aspect of focused light on CD.
Figure 5:
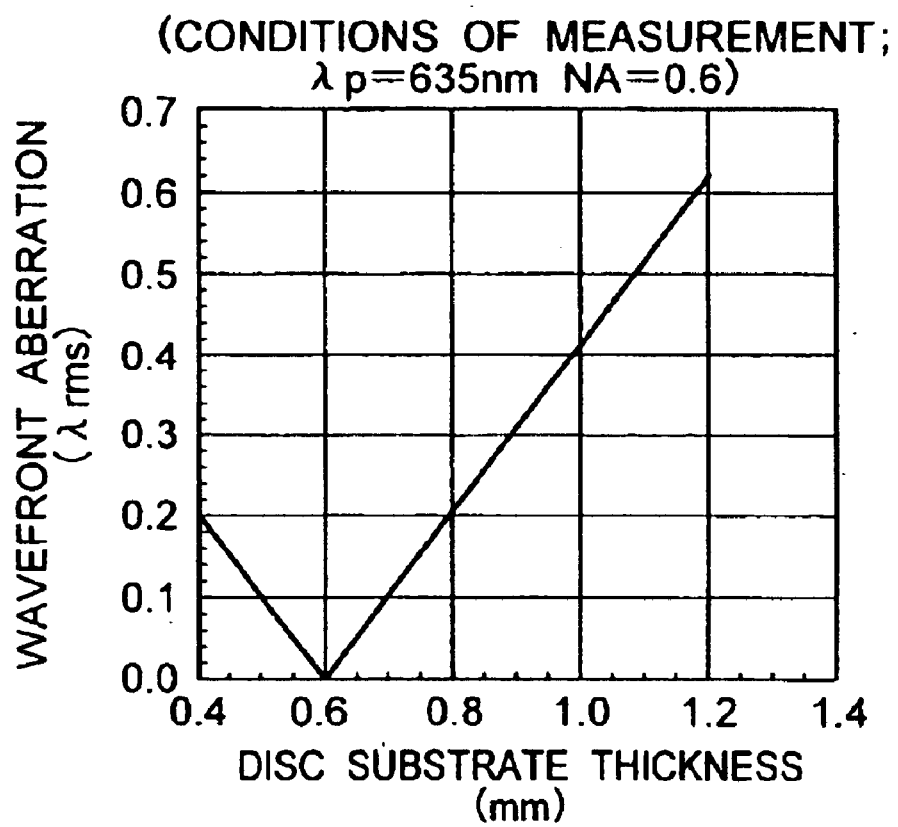
FIG. 5 is a graph showing a relation between thickness of disc substrates and wavefront aberration.
Figure 6:
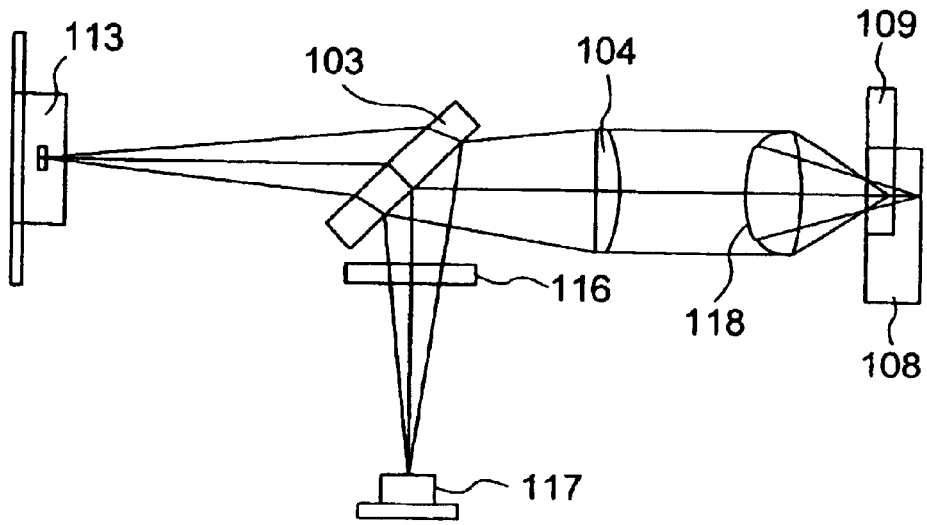
FIG. 6 is an explanatory diagram which schematically shows configuration of a double-source built-in optical pickup device having a first wavefront aberration correcting device for the CD wavelength.

For introducing the reflected light from the optical disc into the detecting PD 113, the half mirror shown in FIG. 6 may be used in lieu of the prism 103. Further, the hologram element shown in FIG. 3B may be interposed between the LD 113 and the concave lens 301 or the collimator lens 104. In this case, the detecting PD 113 is located near the LD 111 as shown in FIG. 3B.

Figure 9:
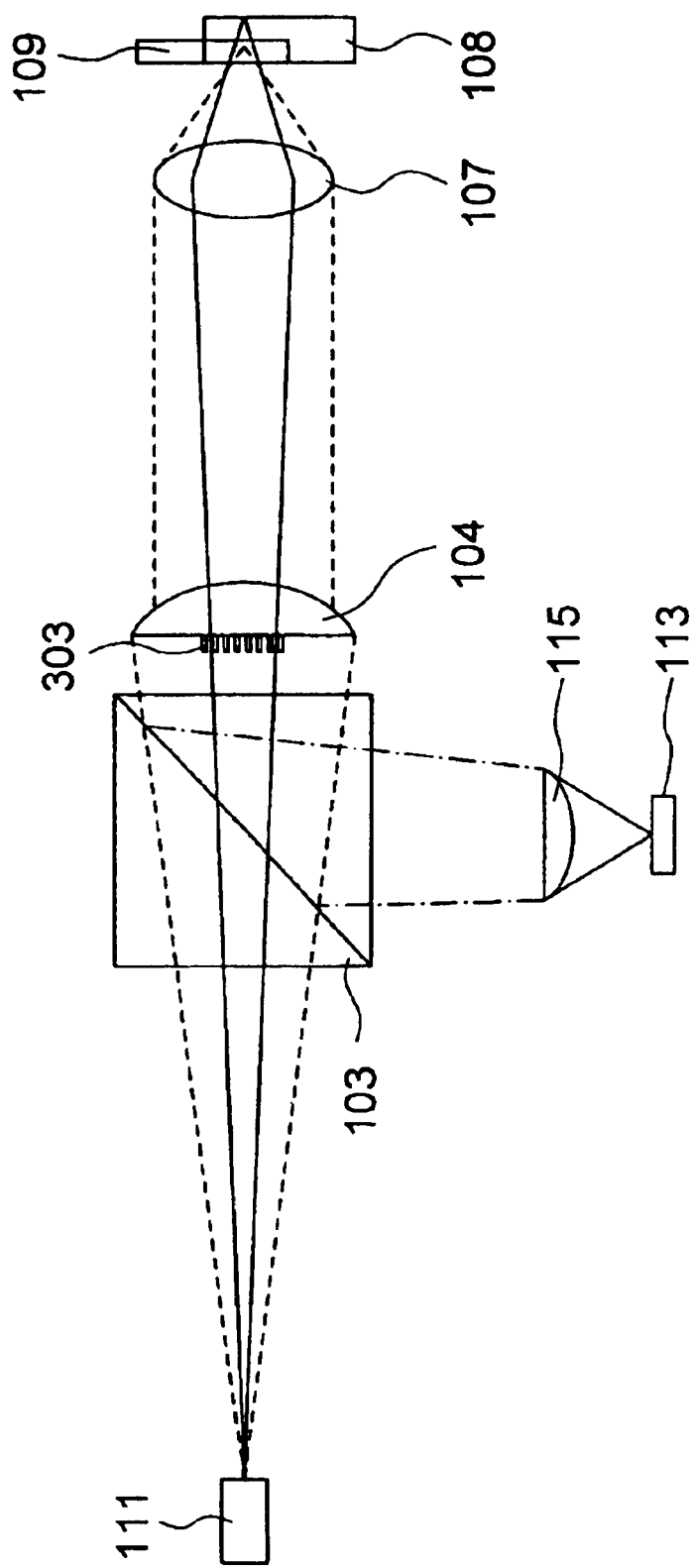
FIG. 9 is an explanatory diagram which schematically shows configuration of an optical pickup device according to the second embodiment of the invention.

FIG. 9 is an explanatory diagram which schematically shows configuration of an optical pickup device according to the second embodiment of the invention.

The optical pickup device according to the second embodiment of the invention shown in FIG. 9 includes a double-source built-in semiconductor laser 111 for emitting light with the center wavelength 650 nm and that of 780 nm; a prism 103 for directly transmitting emitted light from the double-source built-in semiconductor laser 111 and reflecting reflected light from the DVD 109 and the CD 108; a collimator lens 104 that collimates transmitted beams which are emitted light from the double-source built-in semiconductor laser 111; an annular diffraction grating 303 formed on a central portion of one surface of the collimator lens 104 to diffract part of transmitted light of the collimator lens 104 into spread light; an objective lens 107 which focuses light with the center wavelength 650 nm aligned into parallel beams by the collimator lens 104 onto the DVD 109 and focusing light with the center wavelength 780 nm changed into spread light by the collimator lens 104 and the annular diffraction grating 303 onto the CD 108; a cylindrical lens 115 for adjusting astigmatism of reflected light from the prism 103, which is the reflected light from the DVD 109 and the CD 108; and a signal/error detecting photodiode 113 for detecting reflected light from the prism 103, which is the reflected light from the DVD 109 and the CD 108. Although not shown for simplicity like the first embodiment, a folding mirror for reflecting beams from the parallel direction to the vertical direction relative to the optical disc is interposed between the collimator lens 104 and the objective lens 107. That is, the direction of the transmitted light from the collimator lens 104 and the direction of the transmitted light from the objective lens 107 are normal to each other. As explained above, the double-source built-in semiconductor laser 111 is a semiconductor laser array including two light sources built on a common semiconductor substrate, and the distance between two laser emission points is 500 μm or less. Therefore, two optical axes approximately overlap, and they can be regarded as a single common optical axis. Actually, however, under the current technical level of the manufacturing process, the distance between two laser emission points is about 5 μm to 500 μm. The prism 103 may be located between the LD 111 and the collimator lens 104 or may be between the collimator lens 104 and the objective lens 107.

The optical pickup device according to the second embodiment is different from the first embodiment in integrally forming the annular diffraction grating 303 on the central portion of one surface of the collimator lens 104 instead of using the concave lens 301. The annular diffraction grating 303 typically has a corrugated or bladed (sawtoothed) cross sectional configuration. The opposite surface of the collimator lens 104 is shaped as a convex lens.

The light with the center wavelength 650 nm emitted from the LD 111 passes through the prism 103 while spreading outward, and passes through the annular diffraction grating 303 and the collimator lens 104. The part of the emitted light from the LD 111, which passes through the portion of the collimator lens 104 other than the portion thereof having the annular diffraction grating 303, is converged into parallel beams by the collimator lens 104. That is, the light passing through peripheral and central portions of the annular diffraction grating 303 is converged into parallel beams by the collimator lens 104. On the other hand, the part of the emitted light from the LD 111, which passes through the annular diffraction grating 303 is diffracted and becomes diffracted light including the annular bright parts (primary light, secondary light, . . . ) and the bright portion in the central portion near the optical axis (zero-order light) surrounded by the annular bright parts. The primary light, in particular, in the diffracted light remains as spread light even after passing through the collimator lens 104, but most part of the portion in the central portion near the optical axis, which is zero-order light, becomes substantially parallel beams after passing through the collimator lens 104. Then, the emitted light from the LD 111 is reflected to the vertical direction relative to the DVD 109 by the redirecting mirror, and enters into the objective lens 107. Part of the light with the center wavelength 650 nm entering as parallel beams into peripheral and central portions of the objective lens 107 is focused onto the DVD 109 and reflected thereby as shown in FIG. 7A. On the other hand, the light entering as spread beams into the annular portion around the optical axis of the objective lens 107 does not focus onto the DVD 109 due to the wavefront aberration caused by the diffraction grating 303, and it is not used substantially. However, for DVD, by using an objective lens having the numerical aperture of 0.6 which sufficiently decreases the wavefront aberration for the thickness of 0.6 mm of DVD disc substrates and sufficiently using the light entering into the peripheral portion and the central portion of the objective lens 107 as parallel beams, an acceptable amount of light for getting recorded data from the DVD 109 can be obtained. The reflected light reflected by the DVD 109 contains data about the presence or absence of recording pits on the DVD 109, and it returns along the path of the emitted light in the opposite direction, and after being reflected by the prism 103 and adjusted in astigmatism by the cylindrical lens 115, it is detected by the detecting PD 113.

On the other hand, the light with the center wavelength 780 nm emitted from the LD 111 passes through the prism 103 while spreading outward, and passes through the annular diffraction grating 303 and the collimator lens 104. The part of the emitted light from the LD 111, which passes through the portion of the collimator lens 104 other than the portion thereof having the annular diffraction grating 303, is converged into parallel beams by the collimator lens 104. That is, the light passing through peripheral and central portions of the annular diffraction grating 303 is converged into parallel beams by the collimator lens 104. On the other hand, the part of the emitted light from the LD 111, which passes through the annular diffraction grating 303 is diffracted and becomes diffracted light including the annular bright parts (first-order diffracted light, second-order diffracted light, . . . ) and the bright portion in the central portion near the optical axis (zero-order light) surrounded by the annular bright parts. Most part of the portion of the diffracted light in the central portion near the optical axis, which is zero-order light, becomes substantially parallel beams after passing through the collimator lens 104, but the annular bright parts, in particular first-order light, remains as spread light even after passing through the collimator lens 104. Then, the emitted light from the LD 111 is reflected to the vertical direction relative to CD 108 by the folding mirror, and enters into the objective lens 107. The part of the light with the center wavelength 780 nm entering as spread beams into the peripheral and the central portions of the objective lens 107 is focused onto the CD 108 and reflected thereby as shown in FIG. 7C. That is, by introducing the light with the center wavelength 780 nm as spread beams into the objective lens 107, the wavefront aberration caused by the 1.2 mm thickness of the disc substrate of the CD 108 can be cancelled. On the other hand, the light entering as parallel beams into the peripheral and central portions of the objective lens 107 does not focus onto the CD 108 due to the wavefront aberration caused by the 1.2 mm thickness of the disc substrate of the CD 108, and it is not used substantially. However, since CDs have a wider tolerance against signal deterioration than DVDs as mentioned above, and the maximum numerical aperture of the objective lens 107 used for CD is 0.45, by mainly using the light entering into the annular portion around the optical axis of the objective lens 107 as spread light, an acceptable amount of light for getting recorded data from the CD 108 can be obtained. The reflected light reflected by the CD 108 contains data about the presence or absence of recording pits on the CD 108, and it returns along the path of the emitted light in the opposite direction, and after being reflected by the prism 103 and adjusted in astigmatism by the cylindrical lens 115, it is detected by the detecting PD 113.

Since the optical pickup device according to the second embodiment of the invention uses the annular diffraction grating 303 integrally formed on the central portion of one surface of the collimator lens 104 instead of the concave lens 301 used in the first embodiment, it does not need positional adjustment of the annular diffraction grating 303.

Similarly to the first embodiment, for the purpose of introducing the reflected light from the optical disc into the detecting PD 113, the half mirror shown in FIG. 6 may be used in lieu of the prism 103. Further, the hologram element shown in FIG. 3B may be interposed between the LD 111 and the collimator lens 104. In this case, the detecting PD 113 is located near the LD 111 as shown in FIG. 3B.

FIGS. 10A through 10C are explanatory diagrams which schematically show configuration of an optical pickup device according to the third embodiment of the invention. FIG. 10A is an explanatory diagram schematically showing entire configuration of the optical pickup device according to the third embodiment, and FIGS. 10B and 10C are plan views which schematically show configurations of a hologram element used in the optical pickup device according to the third embodiment of the invention, which are viewed from the position of the light source.

The optical pickup device according to the third embodiment of the invention shown in FIGS. 10A through 10C includes a double-source built-in semiconductor laser 111 for emitting light-with the center wavelength 650 nm and that of 780 nm; a prism 103 for directly transmitting emitted light from the double-source built-in semiconductor laser 111 and reflecting reflected light from the DVD 109 and the CD 108; a hologram element 112 which diverges the central part of light near the optical axis in the transmitted light, which is the emitted light from the double-source built-in semiconductor laser 111, into spread beams, and converges the light in the peripheral annular area into parallel beams; an objective lens 107 which focuses the light with the center wavelength 650 nm aligned into parallel beams by the hologram element 112 onto the DVD 109 and focuses the light with the center wavelength 780 nm changed into spread beams by the hologram element 112 onto the CD 108; a cylindrical lens 115 for adjusting astigmatism of reflected light from the prism 103, which is the reflected light from the DVD 109 and the CD 108; and a signal/error detecting photodiode 113 for detecting reflected light from the prism 103, which is the reflected light from the DVD 109 and the CD 108. Similarly to the first and second embodiments, although not shown for simplicity, a folding mirror for reflecting beams from the parallel direction to the vertical direction relative to the optical disc is interposed between the hologram element 112 and the objective lens 107. That is, the direction of the transmitted light from the hologram element 112 and the direction of the transmitted light from the objective lens 107 are normal to each other. As explained above, the double-source built-in semiconductor laser 111 is a semiconductor laser array including two light sources built on a common semiconductor substrate, and the distance between two laser emission points is 500 μm or less.

Therefore, two optical axes approximately overlap, and they can be regarded as a single common optical axis. Actually, however, under the current technical level of the manufacturing process, the distance between two laser emission points is about 5 μm to 500 μm. The prism 103 may be located between the LD 111 and the hologram element 112 or may be between the hologram element 112 and the objective lens 107.

The optical pickup device according to the third embodiment is different from the first embodiment in providing the integrally formed hologram element 112 having the function equivalent to the concave lens 301 and the collimator lens 104, instead of using the concave lens 301 and the collimator lens 104. As an example of the hologram element 112 shown in FIG. 10B, the peripheral annular region 304 of the hologram element 112 forms a hologram having the function of a convex lens with the focal length around 20 mm and numerical aperture around 0.1 so that the laser light with the center wavelength 650 nm is converged into parallel beams. The central portion 305 of the hologram element 112 forms a hologram having the function of a convex lens with a longer focal length than 20 mm of the peripheral annular region 304 so that first-order diffracted light of the laser light with the center wavelength 780 nm is spread thereby and converged by the objective lens 107 to focalize onto the CD 108 with the disc substrate thickness of 1.2 mm.

To make the hologram element 112 on a single piece of glass or resin, after determining the phase transfer functions of the peripheral annular region 304 and the central region 305 independently, it is incorporated integrally upon designing a microprocessing photo mask or mold. Cross-sectional configuration of the hologram element 112 is typically corrugated or blade-like (sawtoothed).

The hologram element 112 may be a hologram formed on both surfaces of the substrate. In this case, a hologram pattern extending over the entire area of the substrate is formed as the hologram element of the peripheral annular region 304 on one surface of the substrate whereas a small hologram pattern having the function of a concave lens is formed only on the central portion on the other surface of the substrate. FIG. 10C shows one of the opposite surfaces of the substrate, on which the hologram pattern 306 made by enlarging the hologram pattern in the peripheral annular region 304 to the entire surface of the substrate.

The light with the center wavelength 650 nm emitted from the LD 111 passes through the prism 103 while spreading outward, and further passes through the hologram element 112. The part of the emitted light from the LD 111, which passes through the peripheral annular region 304 of the hologram element 112, is converged into parallel beams by the hologram in the peripheral annular region 304. On the other hand, the part of the emitted light from LD 111, which passes through the central portion 305 of the hologram element 112 near the optical axis, is diffracted by the hologram in the central portion 305 and becomes diffracted light including the annular bright parts (first-order diffracted light, second-order diffracted light, . . . ) and the bright portion in the central portion near the optical axis (zero-order light) surrounded by the bright annular parts. The first-order diffracted light, in particular, in the diffracted light becomes spread beams, but most part of the portion in the central portion near the optical axis, which is zero-order light, becomes substantially parallel beams. Then, the emitted light from the LD 111 is reflected to the vertical direction relative to the DVD 109 by the folding mirror, and enters into the objective lens 107. The part of the light with the center wavelength 650 nm entering as parallel beams into peripheral and central portions of the objective lens 107 is focused onto the DVD 109 and reflected thereby as shown in FIG. 7A. On the other hand, the light entering as spread beams into the annular portion around the optical axis of the objective lens 107 does not focus onto the DVD 109 due to the wavefront aberration caused by the hologram in the central portion 305 of the hologram element 112, and it is not used substantially. However, for DVD, by using an objective lens having the numerical aperture of 0.6 which sufficiently decreases the wavefront aberration for the thickness of 0.6 mm of DVD disc substrates and sufficiently using the light entering into the peripheral portion and the central portion of the objective lens 107 as parallel beams, an acceptable amount of light for getting recorded data from the DVD 109 can be obtained. The reflected light reflected by the DVD 109 contains data about the presence or absence of recording pits on the DVD 109, and it returns along the path of the emitted light in the opposite direction, and after being reflected by the prism 103 and adjusted in astigmatism by the cylindrical lens 115, it is detected by the detecting PD 113.

On the other hand, the light with the center wavelength 780 nm emitted from the LD 111 passes through the prism 103 while spreading outward, and further passes through the hologram element 112. The part of the emitted light from the LD 111, which passes through the peripheral annular region 304 of the hologram element 112, is converged into parallel beams by the hologram in the peripheral annular region 304. On the other hand, the part of the emitted light from LD 111, which passes through the central portion 305 of the hologram element 112 near the optical axis, is diffracted by the hologram in the central portion 305 and becomes diffracted light including the annular bright parts (first-order light, second-order light, . . . ) and the bright portion in the central bright portion near the optical axis (zero-order light) surrounded by the annular bright parts. Most part of the diffracted light in the central portion near the optical axis, which is zero-order light, becomes substantially parallel beams, but the annular bright portion, in particular the first-order light, becomes spread beams. Then, the emitted light from the LD 111 is reflected to the vertical direction relative to the CD 108 by the folding mirror, and enters into the objective lens 107. The part of the light with the center wavelength 780 nm entering as spread beams into the annular portion around the optical axis of the objective lens 107 is focused onto CD 108 and reflected thereby as shown in FIG. 7C. That is, by introducing the light with the center wavelength 780 nm as spread beams into the objective lens 107, the wavefront aberration caused by the disc substrate thickness 1.2 mm of the CD 108 can be cancelled. On the other hand, the light entering as parallel beams into peripheral and central portions of the objective lens 107 does not focus onto the CD 108 due to the wavefront aberration caused by the disc substrate thickness 1.2 mm of the CD 108, and it is not used substantially. However, since CDs have a wider tolerance against signal deterioration than DVDs, and the maximum numerical aperture of the objective lens 107 used for CD is 0.45, by mainly using the light entering into the annular portion around the optical axis of the objective lens 107 as spread beams, an acceptable amount of light for getting recorded data from the CD 108 can be obtained. The reflected light reflected by the CD 108 contains data about the presence or absence of recording pits on the CD 108, and it returns along the path of the emitted light in the opposite direction, and after being reflected by the prism 103 and adjusted in astigmatism by the cylindrical lens 115, it is detected by the detecting PD 113.

Since the optical pickup device according to the third embodiment of the invention uses the integrally formed hologram element 112 having the function equivalent to the concave lens 301 and the collimator lens 104, instead of using the concave lens 301 and the collimator lens 104, it does not need positional adjustment of the central portion 305 of the hologram element 112 for spreading light, and a single piece of hologram element 112 is sufficient for the expected role without the need for a collimator lens. Therefore, the structure is simplified, and complicates steps of the lens manufacturing process can be omitted.

Similarly to the first and second embodiments, for the purpose of introducing the reflected light from the optical disc into the detecting PD 113, the half mirror shown in FIG. 6 may be used in lieu of the prism 103. Alternatively, another hologram element as shown in FIG. 3C may be interposed between the LD 111 and the hologram element 112. In this case, the detecting PD 113 is located near the LD 111 as shown in FIG. 3B.

Finally made is a brief statement about the optical disc drive according to the invention. The optical disc drive according to the invention includes the optical pickup device according to any embodiment of the invention explained above, and an optical disc drive device for rotatory driving an optical disc.

As explained above, the invention can provide a double-source built-in pickup device having a relatively simple structure and including a wavefront aberration correcting device which can minimize the wavefront aberration not only of DVD but also CD during data reproduction therefrom. That is, also in an optical pickup device having LDs as light sources, which are different in wavelengths and incorporated on a common semiconductor substrate, it is possible to limit the wavefront aberration within an acceptable range for respective optical discs different in thickness, and its optical system can be simplified significantly while restricting deteriorate of the disc tilt property, the defocusing property, the tracking property, the Littering property, and so on, within an acceptable range.

Additionally, according to the invention, since the optical pickup device is significantly miniaturized, the optical disc drive using it therein can be mounted in portable personal computers, etc.

What is claimed is:

1. An optical pickup device comprising:
    a double-source built-in semiconductor laser array which emits light of a first wavelength and light of a second wavelength;
    a first divergence modifying device which modifies a diverging rate of the emitted light to a first diverging rate;
    a second divergence modifying device which modifies a diverging rate of part of the emitted light to be transmitted concentrically;
    an objective lens which focalizes the light with said first wavelength modified to the first diverging rate by said first divergence modifying device onto a first optical disc, and focalizes the light with said second wavelength modified to a second diverging rate which is determined by said first and second divergence modifying devices onto a second optical disc;
    a reflected light separating device which separates reflected beams from said first and second optical discs away from the path of the emitted light from said double-source built-in semiconductor laser array; and
    a detecting device which detects the reflected beams from said first and second optical discs separated by said reflected light separating device, wherein said first divergence modifying device is a collimator lens which converges transmitted light into parallel beams, said second divergence modifying device being a concave lens which spreads part of the emitted light to be transmitted concentrically through said collimator lens, and said objective lens focalizing the light of said first wavelength collimated into the parallel beams by said collimator lens onto a first optical disc and focalizing the light of said second wavelength modified into spread beams which is determined by said collimator lens and said concave lens onto a second optical disc.

2. The optical pickup device according to claim 1 further comprising an astigmatism adjusting device interposed between said reflected light separating device and said detecting device to adjust the astigmatism of reflected beams from said first and second optical discs.

3. The optical pickup device according to claim 1 further comprising a redirecting mirror located at incidence side of said objective lens to reflect light from the parallel direction to the vertical direction relative to said first and second optical discs.

4. The optical pickup device according to claim 1 wherein said first and second optical discs are DVD and CD, said light of said first wavelength is laser light whose center wavelength is 650 nm, and said light of said second wavelength is laser light whose center wavelength is 780 nm.

5. An optical pickup device comprising:

a double-source built-in semiconductor laser array which emits light of a first wavelength and light of a second wavelength;

a concentric hologram element comprising an annular outer region and a circular inner central region, said annular outer region producing a parallel first order diffracted light of part of the emitted diverging light of the first wavelength, said circular inner central region producing a spread first order diffracted light of part of the emitted diverging light of the second wavelength at smaller diverging angles compared to those of said laser array, an objective lens which focalizes the light of said first wavelength changed into the parallel beams onto a first optical disc, and focalizes the light of said second wavelength changed into the spread beams onto a second optical disc;

a reflected light separating device which separates reflected beams from said first and second optical discs away from the path of the emitted light from said double-source built-in semiconductor laser array; and a detecting device which detects the reflected beams from said first and second optical discs separated by said reflected light separating device.

6. The optical pickup device according to claim 5 further comprising an astigmatism adjusting device interposed between said reflected light separating device and said detecting device to adjust the astigmatism of reflected beams from said first and second optical disks.

7. The optical pickup device according to claim 5 wherein said first and second optical discs are DVD and CD, said light of said first wavelength is laser light whose center wavelength is 650 nm, and said light of said second wavelength is laser light whose center wavelength is 780 nm.

8. An optical disc driving device comprising:

an optical pickup device including a double-source built-in semiconductor laser array which emits light of a first wavelength and light of a second wavelength; a first divergence modifying device which modifies a diverging rate of the emitted light to a first diverging rate; a second divergence modifying device which modifies the diverging rate of part of the emitted light to be transmitted concentrically an objective lens which focalizes the light with said first wavelength modified to the first diverging rate by said first divergence modifying device onto a first optical disc, and focalizes the light with said second wavelength modified to a second diverging rate which is determined by said first and second divergence modifying devices onto a second optical disk; a reflected light separating device which separates reflected beams from said first and second optical discs away from the path of the emitted light from said double-source built-in semiconductor laser array; and a detecting device which detects the reflected beams from said first and second optical discs separated by said reflected light separating device, wherein said first divergence modifying device is a collimator lens which converges transmitted light into parallel beams, said second divergence modifying device being a concave lens which spreads part of the emitted light to be transmitted concentrically through said collimator lens, and said objective lens focalizing the light of said first wavelength collimated into the parallel beams by said collimator lens onto a first optical disc and focalizing the light of said second wavelength modified into spread beams which is determined by said collimator lens and said concave lens onto a second optical disc; and an optical disc driving device for rotatory driving said optical disc.

9. An optical disc driving device comprising:

an optical pickup device including a double-source built-in semiconductor laser array which emits light of a first wavelength and light of a second wavelength; a concentric hologram element comprising an annular outer region and a circular inner central region, said annular outer region producing a parallel first order diffracted light of part of the emitted diverging light of the first wavelength, said circular inner central region producing a spread first order diffracted light of part of the emitted diverging light of the second wavelength at smaller diverging angles compared to those of said laser array; an objective lens which focalizes the light of said first wavelength changed into the parallel beams onto a first optical disc, and focalizes the light of said second wavelength changed into the spread beams onto a second optical disc; a reflected light separating device which separates reflected beams from said first and second optical discs away from the path of the emitted light from said double-source built-in semiconductor laser array; and a detecting device which detects the reflected beams from said first and second optical discs separated by said reflected light separating device; and an optical disc driving device for rotatory driving said optical disc.

10. An optical pickup device comprising:

a double-source built-in semiconductor laser array which emits light of a first wavelength and light of a second wavelength;

a first divergence modifying device which modifies a diverging rate of the emitted light to a first diverging rate;

a second divergence modifying device which modifies the diverging rate of part of the emitted light to be transmitted concentrically;

an objective lens which focalizes the light with said first wavelength modified to the first diverging rate by said first divergence modifying device onto a first optical disc, and focalizes the light with said second wavelength modified to a second diverging rate which is determined by said first and second divergence modifying devices onto a second optical disc;

a reflected light separating device which separates reflected beams from said first and second optical discs away from the path of the emitted light from said double-source built-in semiconductor laser array; and a detecting device which detects the reflected beams from said first and second optical discs separated by said reflected light separating device;

wherein said first divergence modifying device is a collimator lens which converges transmitted light into parallel beams, said second divergence modifying device being a concave lens which spreads part of the emitted light to be transmitted concentrically, said objective lens focalizing the light of said first wavelength collimated into the parallel beams by said collimator lens onto a first optical disc and focalizing the light of said second wavelength modified into spread beams which is determined by said collimator lens and said concave lens onto a second optical disc.

* * * * *